R. W. STEED.
MEASURING INSTRUMENT.
APPLICATION FILED DEC. 11, 1912.
1,109,479.
Patented Sept. 1, 1914.
2 SHEETS—SHEET 1.
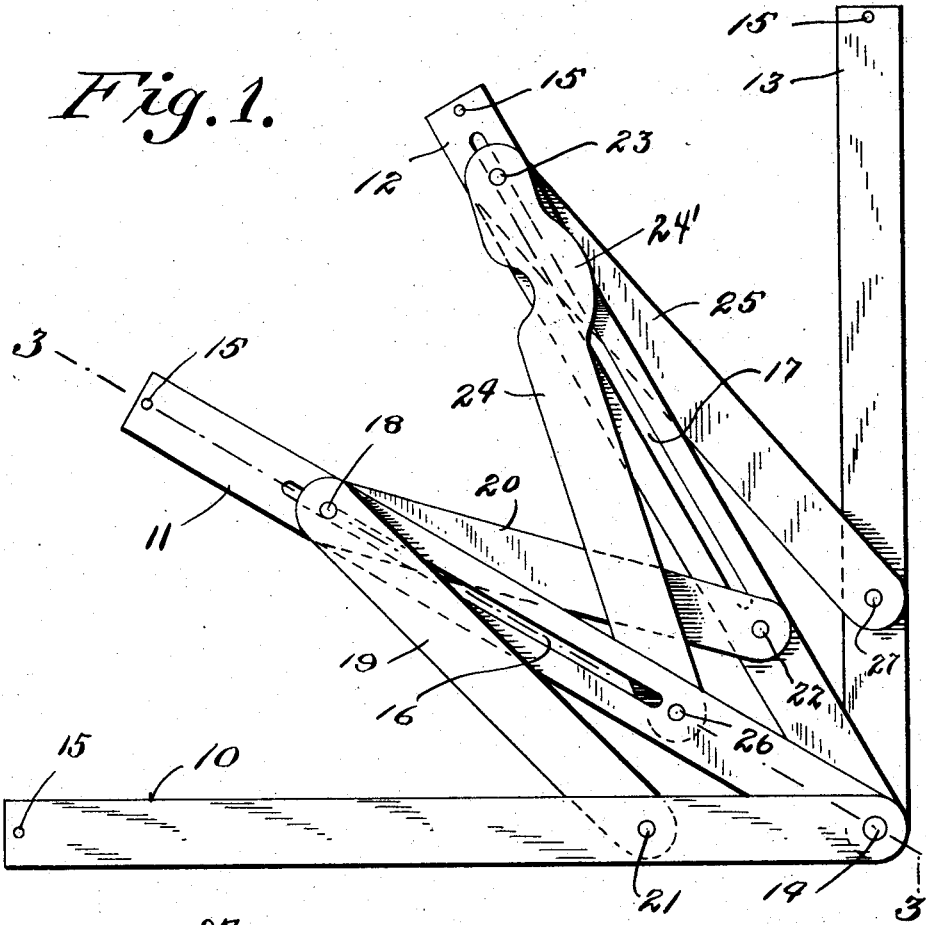
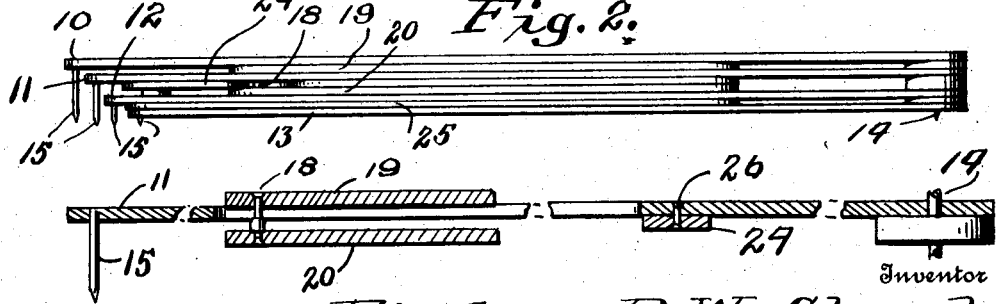

R. W. STEED.
MEASURING INSTRUMENT.
APPLICATION FILED DEC. 11, 1912.
1,109,479.
Patented Sept. 1, 1914.
2 SHEETS—SHEET 2.
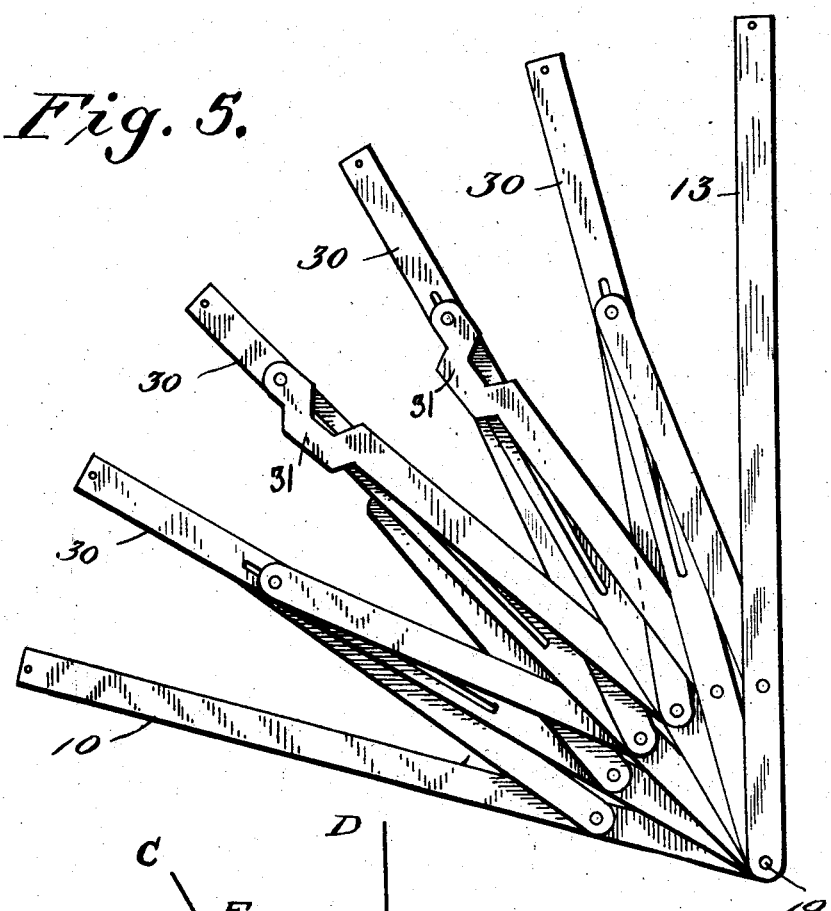
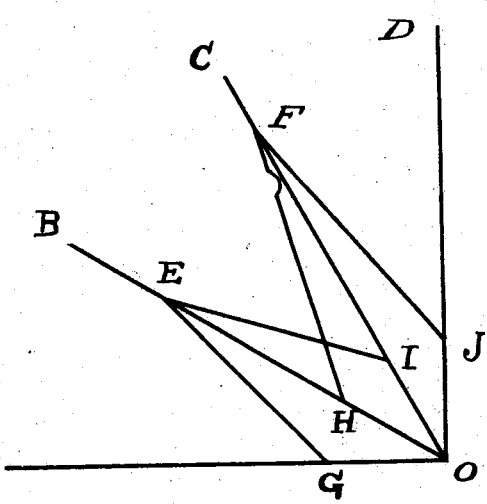

UNITED STATES PATENT OFFICE.

RALPH W. STEED, OF PORTLAND, INDIANA.

MEASURING INSTRUMENT.

1,109,479.   Specification of Letters Patent.   Patented Sept. 1, 1914.

Application filed December 11, 1912. Serial No. 736,140.

*To all whom it may concern:*

Be it known that I, RALPH W. STEED, a citizen of the United States, residing at Portland, in the county of Jay, State of Indiana, have invented certain new and useful Improvements in Measuring Instruments; and I do hereby declare the following to be a full, clear, and exact description of the invention, such as will enable others skilled in the art to which it appertains to make and use the same.

This invention relates to measuring instruments.

The object of the invention resides in the provision of a measuring instrument which may be utilized with facility in effecting a division of given angles into a desired number of equal parts without resorting to any mathematical computation or any geometrical process.

A further object of the invention resides in the provision of a measuring instrument of the character referred to which may be utilized with facility in drafting, building, plotting and various other lines of mechanical work.

With the above and other objects in view, the invention consists in the details of construction and in the arrangement and combination of parts to be hereinafter more fully described and particularly pointed out in the appended claims.

In describing the invention in detail, reference will be had to the accompanying drawings wherein like characters of reference denote corresponding parts in the several views, and in which—

Figure 1 is a plan view of an instrument constructed in accordance with the invention, same being shown in an expanded state and of a type adapted to effect the division of an angle into three equal parts, Fig. 2, a side elevation of the instrument, same being shown in a folded state, Fig. 3, a section on the line 3—3 of Fig. 1, Fig. 4, a view similar to Fig. 1 with the various parts of the instrument indicated by single lines so as to disclose more clearly the geometrical principle upon which the operation of the instrument is based, and Fig. 5, a plan view of an instrument constructed in accordance with the invention, and adapted to be utilized in effecting the division of a given angle into five different parts.

Referring to the drawings, the instrument is shown as comprising a plurality of arms 10, 11, 12 and 13 corresponding ends of which are pivotally connected together by a suitable pivot pin 14. It will be noted that when the arms are moved on their common pivot so as to lie in juxtaposition the arms 10 and 13 will be disposed so as to confine the arms 11 and 12 therebetween, said arms 10 and 13 constituting the limiting arms and the arms 11 and 12 the intermediate arms of the instrument. The arms of the instrument decrease in length successively from the arm 10 to the arm 13 and each of the arms has mounted in its free end a marker 15 the marking points being all disposed in the same plane so that when the instrument is applied to a given piece of work the marker 15 in conjunction with the pivot pin 14 support the instrument level. The intermediate arms 11 and 12 are provided respectively with longitudinal slots 16 and 17. Passing through the longitudinal slot 16 and slidable therein is a pivot pin 18 to which are pivotally connected the outer ends of connecting links 19 and 20 disposed respectively on opposite sides of the arm 11, said links 19 and 20 being equal in length. The inner end of the link 19 is pivotally connected at 21 to the limiting arm 10, while the inner end of the link 20 is pivotally connected to the intermediate arm 12 at 22, said pivotal connections 21 and 22 being disposed equal distances from the pivot pin 14. Passing through and slidable in the slot 17 is a pivot pin 23 to which are pivotally connected the outer ends of links 24 and 25 disposed respectively on opposite sides of the arm 12. The inner end of the link 24 is pivotally connected to the arm 11 at 26, while the inner end of the link 25 is pivotally connected to the limiting arm 13 at 27, and both of the pivotal connections 26 and 27 are disposed the same distance from the pivot pin 14 as the pivotal connections 21 and 22.

In the use of the instrument the pivotal connection 14 is placed upon the apex of the angle it is desired to divide and the marking points 15 of the limiting arms 10 and 13 positioned on the respective sides of the angle. With the instrument in this relation to the angle to be divided the points 15 of the arms 11 and 12 are impressed into the work so as to produce the desired mark. Lines are then drawn connecting the apex of the angle with the marks produced by the point 15 of the arms 11 and 12 and these lines will divide the angles into three parts.

The geometrical principle upon which the instrument is based can be best disclosed by reference to Fig. 4. In this figure the lines AO, BO, CO and DO correspond respectively to the arms 10, 11, 12 and 13 of the instrument, while the lines EG, EI, FH, and FJ correspond respectively to the links 19, 20, 24 and 25 of the instrument. Now, in the triangles EGO and EIO, GO=IO, GE=IE, and EO is common. Therefore the angle GOE=EOI. Again, in the triangles FHO and FJO, HO=JO, FH=FJ, and FO is common, therefore the angle HOF = the angle JOF. As the angle HOF is the same angle as EOI the angle GOE = the angle JOF and the angle AOD is divided into three equal parts by the lines BO and CO.

In the modified form of instrument illustrated in Fig. 5 there are employed four intermediate arms 30 between the limiting arms 10 and 13. In all other respects the construction and principle involved in the instrument shown in Fig. 5 is identical with that previously described in connection with the instrument shown in Fig. 1. By utilizing four intermediate arms 30 in the modified form of instrument it will be obvious that same may be utilized to divide an angle into five equal parts.

Referring to Fig. 1 and Fig. 5 it will be noted that one of the links 24 is provided with an offset portion 24′, while certain of the links in Fig. 5 are provided with offset portions 31. These offset portions are adapted to receive an adjacent pivot pin whereby the instrument may be folded to dispose the arms and links one above the other with their longitudinal axes in a common plane.

While two forms of the instrument have been shown and described it will be apparent that the principle involved may be extended indefinitely so as to produce an instrument adapted to effect the division of an angle into any desired number of equal parts.

What is claimed is:

1. An instrument of the class described comprising a pair of limiting arms and a plurality of intermediate arms, a pivot pin connecting corresponding ends of said limiting and intermediate arm, said pin being extended at one end to form a point, pins mounted in the free ends of the limiting and intermediate arms having their outer ends disposed in a common plane with the outer end of the pivot pin, and means operated by the movement of the limiting arms toward and away from each other for simultaneously altering the position of the intermediate arms to constantly maintain the angles between adjacent intermediate arms and between the limiting arms and adjacent intermediate arms equal.

2. An instrument of the class described comprising a plurality of arms having corresponding ends mounted on a common pivot, certain of said arms having each a longitudinal slot, a pivot pin slidable in each of said slots, and a plurality of pairs of connecting links, the links of each pair having their outer ends mounted on a common pivot pin and their inner ends pivotally connected to adjacent arms at points equidistant from the common pivot of said arms, and certain of said links being provided with offset portions for receiving an adjacent pivot pin whereby the instrument may be folded to dispose the arms and links one above the other with their longitudinal axes in a common plane.

In testimony whereof, I affix my signature, in presence of two witnesses.

RALPH W. STEED.

Witnesses:
  JAMES H. STEED,
  OLIVER K. STEED.

---

Copies of this patent may be obtained for five cents each, by addressing the "Commissioner of Patents, Washington, D. C."